US011921197B2

(12) United States Patent
Haslinger et al.

(10) Patent No.: US 11,921,197 B2
(45) Date of Patent: Mar. 5, 2024

(54) CONTROLLER FOR A COMMUNICATION AND RANGING APPARATUS

(71) Applicant: NXP B.V., Eindhoven (NL)

(72) Inventors: Dorian Haslinger, Nestelbach bei Graz (AT); Wolfgang Eber, Graz (AT); Mehmet Ufuk Buyuksahin, Graz (AT)

(73) Assignee: NXP B.V., Eindhoven (NL)

( * ) Notice: Subject to any disclaimer, the term of this patent is extended or adjusted under 35 U.S.C. 154(b) by 282 days.

(21) Appl. No.: 17/469,266

(22) Filed: Sep. 8, 2021

(65) Prior Publication Data

US 2022/0099825 A1     Mar. 31, 2022

(30) Foreign Application Priority Data

Sep. 30, 2020 (EP) .................................... 20199441

(51) Int. Cl.
*G01S 13/931* (2020.01)
*G01S 13/02* (2006.01)
*G01S 13/18* (2006.01)

(52) U.S. Cl.
CPC ............ *G01S 13/931* (2013.01); *G01S 13/18* (2013.01); *G01S 2013/0254* (2013.01); *G01S 2013/9325* (2013.01)

(58) Field of Classification Search
CPC ................... G01S 13/931; G01S 13/18; G01S 2013/0254; G01S 2013/9325
USPC .......................................... 342/70, 146, 465
See application file for complete search history.

(56) References Cited

U.S. PATENT DOCUMENTS

| 8,134,992 B1 | 3/2012 | Nam et al. |
| 2018/0352554 A1 | 12/2018 | Flynn et al. |
| 2020/0204203 A1* | 6/2020 | de Perthuis ........ G07C 9/00309 |

FOREIGN PATENT DOCUMENTS

| CN | 110858981 A | 3/2020 |
| EP | 2360973 B1 | 8/2011 |
| JP | 2004525536 A | 8/2004 |

* cited by examiner

*Primary Examiner* — Bo Fan

(57) ABSTRACT

A controller for a communication and ranging apparatus wherein the apparatus is configured to transmit both a data signal and a ranging signal, wherein the controller is configured to: determine a scheduled transmission event of the data signal; determine a scheduled transmission event of the ranging signal; determine if the scheduled transmission events will occur within a predetermined time window of each other; if it is determined that the scheduled transmission events will occur within a predetermined time window of each other, then determine a priority signal and a secondary signal, wherein: the priority signal is one of the data signal and the ranging signal; and the secondary signal is the other of the data signal and the ranging signal; and provide signaling configured to prevent the scheduled transmission event of the secondary signal from being transmitted such that only the scheduled transmission event of the priority signal is transmitted.

22 Claims, 2 Drawing Sheets

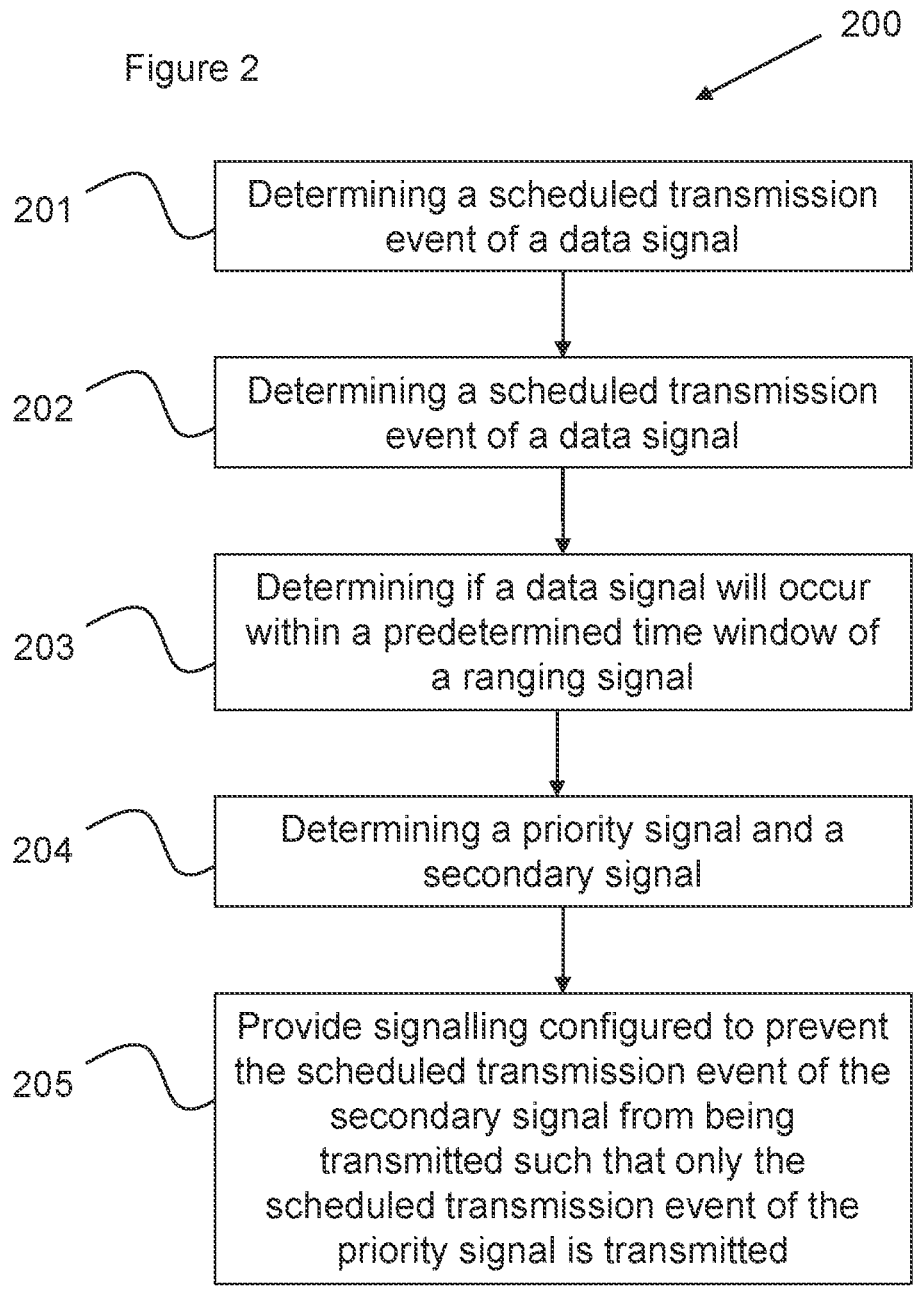

CONTROLLER FOR A COMMUNICATION AND RANGING APPARATUS

FIELD

The present disclosure relates to a controller for a communication and ranging apparatus, the communication and ranging apparatus itself, a method for controlling the communication and ranging apparatus and a computer readable medium comprising instructions to cause a processor to carry out the method for controlling the communication and ranging apparatus. In particular, this disclosure relates to a controller, apparatus, method and computer readable medium for reducing the likelihood of lost or corrupted transmitted packets and for improving the battery life of an apparatus which uses both communication and a ranging signaling.

SUMMARY

According to a first aspect of the present disclosure there is provided a controller for a communication and ranging apparatus wherein the communication and ranging apparatus is configured to transmit both a data signal from a first antenna and a ranging signal from a second antenna, wherein the controller is configured to:
  determine a scheduled transmission event of the data signal;
  determine a scheduled transmission event of the ranging signal;
  determine if the scheduled transmission event of the data signal will occur within a predetermined time window of the scheduled transmission event of the ranging signal, or vice versa;
  if it is determined that the scheduled transmission event of the data signal will occur within a predetermined time window of the scheduled transmission event of the ranging signal, or vice versa, then determine a priority signal and a secondary signal, wherein: the priority signal is one of the data signal and the ranging signal; and the secondary signal is the other of the data signal and the ranging signal; and
  provide signaling configured to prevent the scheduled transmission event of the secondary signal from being transmitted such that only the scheduled transmission event of the priority signal is transmitted.

In one or more embodiments, the controller may be configured to determine the priority signal and the secondary signal based on one or more of:
  a distance between the communication and ranging apparatus and the remote device;
  movement of the communication and ranging apparatus;
  a signal strength of one or both of the data signal and the ranging signal;
  a remaining charge level of a power supply that is configured to provide power to the communication and ranging apparatus;
  a historical log of transmission events; and
  a user-initiated measurement event.

In one or more embodiments, the controller may be configured to:
  calculate a priority score for each of the data signal and the ranging signal; and
  designate the signal with the highest priority score as the priority signal.

In one or more embodiments, the controller may be configured to set the priority score of the data signal based the distance between the communication and ranging apparatus and the remote device.

In one or more embodiments, the controller may be configured to set the priority score for the ranging signal based on a detection that the communication and ranging apparatus.

In one or more embodiments, the controller may be configured to:
  receive signaling from an accelerometer forming part of the communication and ranging apparatus, wherein the signaling is indicative of movement of the communication and ranging apparatus; and
  determine the priority signal and the secondary signal based on the signaling from an accelerometer.

In one or more embodiments, the controller may be configured to one or both of:
  decrease the priority score of the data signal if a data signal strength of the data signal is below a data signal strength threshold; and
  decrease the priority score of the ranging signal if a ranging signal strength of the ranging signal is below a ranging signal strength threshold.

In one or more embodiments, the controller may be configured to increase the priority score of the ranging signal in response to receiving signaling indicative of a measurement event.

In one or more embodiments, the controller may be configured to decrease the priority score of the ranging signal in response to receiving signaling indicative that a charge level the power supply is below a predetermined charge level.

In one or more embodiments, the controller may be configured to one or both of:
  increase the priority score of the data signal if a minimum number of data signal transmission events have not occurred in a first predetermined preceding time period according to a historical log of transmission events; and
  increase the priority score of the ranging signal if a minimum number of ranging signal transmission events have not occurred in a second predetermined preceding time period according to the historical log of transmission events.

In one or more embodiments, the controller may be configured to designate one of the data signal and the ranging signal as the priority signal based on one or more of:
  the distance between the communication and ranging apparatus and the remote device being greater than a data override distance;
  the distance between the communication and ranging apparatus and the remote device being less than a ranging override distance;
  a speed of movement of the communication and ranging apparatus being greater than an override speed;
  the signal strength of the data signal being below a data signal strength override threshold or the signal strength of the ranging strength being below a ranging signal strength override threshold;
  the number of data signal transmission events in the first predetermined preceding time period is below an override number of data signal transmission events or the number of ranging signal transmission events in the second predetermined time period is below an override number of ranging signal transmission events according to the historical log of transmission events;
  a measurement event.

In one or more embodiments, the data signal may be a Bluetooth low energy, BLE, signal and the ranging signal may be an ultrawideband, UWB, signal.

According to a second aspect of the present disclosure, there is provided a communication and ranging apparatus comprising:

a first antenna configured to transmit a data signal;
a second antenna configured to transmit a ranging signal; and
the controller of the first aspect.

According to a third aspect of the present disclosure, there is provided a method of controlling a communication and ranging apparatus wherein the communication and ranging apparatus is configured to transmit both a data signal from a first antenna and a ranging signal from a second antenna, the method comprising:

determining a scheduled transmission event of the data signal;
determining a scheduled transmission event of the ranging signal;
determining if the scheduled transmission event of the data signal will occur within a predetermined time window of the scheduled transmission event of the ranging signal;
if it is determined that the scheduled transmission event of the data signal will occur within a predetermined time window of the scheduled transmission event of the ranging signal, the method further comprises determining a priority signal and a secondary signal, wherein the priority signal is one of the data signal and the ranging signal and the secondary signal is the other of the data signal and the ranging signal; and
providing signaling configured to prevent the scheduled transmission event of the secondary signal from being transmitted such that only the scheduled transmission event of the priority signal is transmitted.

According to a fourth aspect of the present disclosure, there is provided a computer readable medium comprising instructions to cause a processor to carry out the method of the third aspect.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future Claim sets. The figures and Detailed Description that follow also exemplify various example embodiments. Various example embodiments may be more completely understood in consideration of the following Detailed Description in connection with the accompanying Drawings.

BRIEF DESCRIPTION OF THE DRAWINGS

One or more embodiments will now be described by way of example only with reference to the accompanying drawings in which:

FIG. 2 shows an example method of controlling a communication and ranging apparatus according to one embodiment.

DETAILED DESCRIPTION

Applications such as vehicle access, IoT and general access which require both general management data and information about localisation may require both a radio-based data link and a second radio link which serve to build up the connection between a communication and ranging apparatus (such as a key, a fob or a tag) and a remote device (such as a car, a room or a door). When a localisation protocol is initiated, two signal links may be activated in parallel: one configured to provide for the communication of data between the two devices; and one configured to be used to determine a range between the communication and ranging apparatus and the remote device.

Challenges may arise when incorporating both communication and ranging functionalities into devices having small form factors, such as into key fobs, tags, internet-of-things (IoT) devices or smartwatches. The coexistence of different radios being active at the same time can make it challenging to fulfill all of the system requirements, such as end-to-end (E2E) latency for user experience and power management in the case of battery powered systems. E2E latency might drop significantly as a result of radio interference or the bill of materials (BOM) when specific filters are required on the PCB.

In the case where the communication and ranging apparatus would attempt to transmit both the data signal for communication and the ranging signal for ranging at the same time (or within a predetermined time window of each other), one or both of the signals may be disrupted, thereby causing the loss of packets contained therein due to interference of the signals. It will be appreciated that packets herein may refer to either data packets or packets used for individual ranging operations. It may be desirable to reduce the number of lost packets due to such signal interference. If both the data signal and the ranging signal are transmitted within a predetermined time window of each other, the peak current drawn from the power source of the communication and ranging apparatus increases. It may also be desirable to limit the peak current consumption of the apparatus.

A more stable communication and ranging link between the communication and ranging apparatus and a remote device may provide for a longer connection and a longer ranging interval, thereby helping to reduce the risk of corrupted packages, reduce package corruption and improve battery lifetime.

Rather than attempting to schedule the signals for transmission to not overlap, the present disclosure proposes that, in the event that the two signals would be transmitted within a predetermined time window of one-another, one of the signals should be given priority to transmit while the other signal is inhibited.

Figure 1:
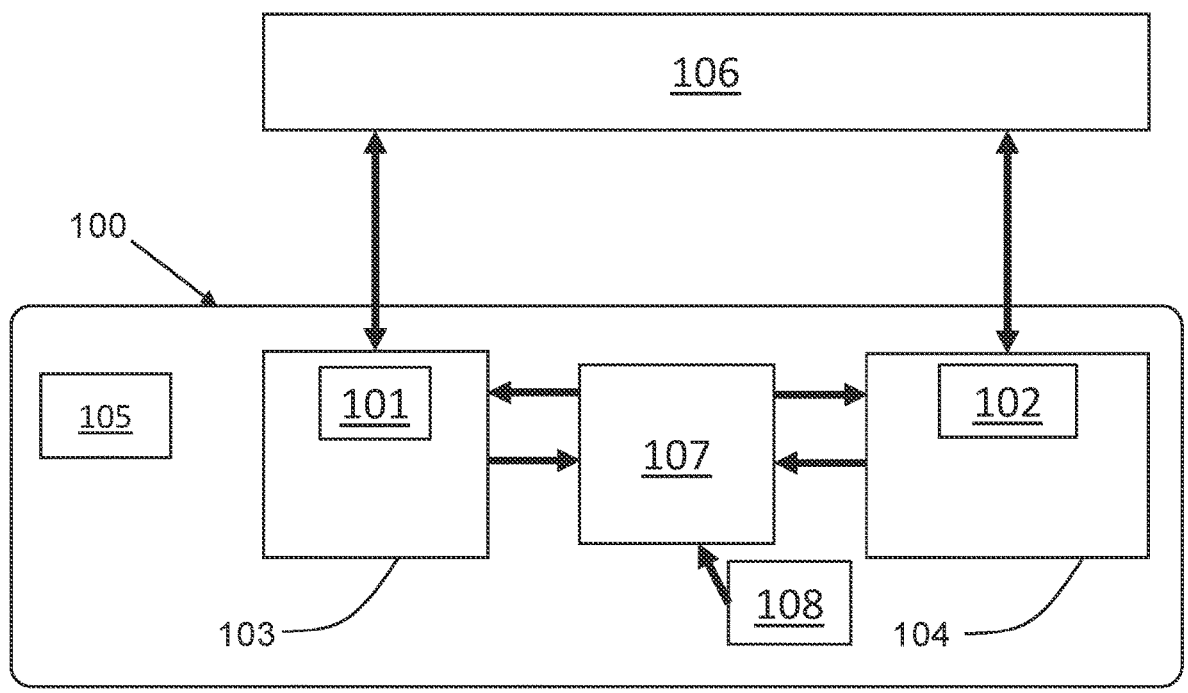
FIG. 1 shows an example embodiment of a communication and ranging apparatus comprising a controller of the present disclosure.

FIG. 1 shows an example embodiment of a communication and ranging apparatus 100. The communication and ranging apparatus 100 may be a key fob for a car, a tag or an IoT device which requires both data and ranging functionalities.

The communication and ranging apparatus 100 may comprise a first antenna 101 configured to transmit the data signal and a second antenna 102 configured to transmit the ranging signal. The first and second antennas 101, 102 may form part of respective first and second transmitters or transceivers, which in turn may form part of a respective data signal controller 103 and a ranging controller 104. The first and second antennas 101, 102 may be configured to transmit the data signal and the ranging signal respectively by being coupled to respective radio frequency sources (not shown) which are configured to generate the data and ranging signals. The respective radio frequency sources may be coupled to a power source 105, such as a cell, a battery or an external power source.

It will be appreciated that the communication and ranging apparatus 100 may comprise other electronics to provide for the generation, control and transmission of signals, however, these will not be explained in detail here.

The data signal that is output by the first antenna 101 may comprise one or more data packets. These data packets may comprise information which is to be sent to a remote device 106, such as to a car, a door or an IoT device. The data may be used for maintaining a connection between the remote device 106 and the communication and ranging apparatus 100 or it may be used to send specific state information or other data. Alternatively, the data may provide, for example, authentication information, ranging specific parameters or capabilities. The data signal may be provided by any suitable means such as by a Bluetooth signal, a Bluetooth low energy (BLE) signal, WiFi, Zigbee, 6LoWPAN or another type of signal.

The ranging signal that is output by the second antenna 102 may comprise one or more packets. Each packet may comprise signaling which can be used to determine the range of the remote device 106 from the communication and ranging apparatus 100. A ranging signal may comprise a single packet or a plurality of packets sent to the remote device 106. In other examples, a ranging signal may comprise a plurality of ranging rounds where each ranging round comprises sending one or more packets to multiple anchors on the remote device 106. This may provide for improved localisation relative to the remote device 106 compared to using a single ranging round. The ranging signal may be a wi-fi signal, an ultra-wide-band (UWB) signal or a Bluetooth Low Energy High Accuracy Distance Measurement (BLE-HADM) signal.

The communication and ranging apparatus 100 further comprises a controller 107, which may also be referred to as a master controller. The controller 107 is configured to determine a scheduled transmission event of the data signal and determine a scheduled transmission event of the ranging signal. In general, a transmission event may be a scheduled transmission event (i.e., a transmission event which will occur at a future point) or a historical transmission event (i.e., a transmission event which has occurred in the past, data about which may be stored in a historical log). A transmission event may comprise a transmission start time, being the time at which the transmission event will (or did) start the process for transmitting the data or ranging signal. Further, the transmission event may comprise a transmission duration, being the amount of time between the start time and the end time of the transmission event. The transmission event may also comprise a transmission end time, being the time at which the transmission event will (or did) stop end. The transmission start and end times may be the time at which the respective antenna starts (or started) transmitting the data signal or the ranging signal. In other embodiments, the transmission start and end times may be before and after the data and ranging signals start or stop transmitting, respectively. For example, a transmission event may be defined to start earlier than when the antenna starts transmitting the data or ranging signal in order to provide time for a sufficient current to be built-up for transmission.

Similarly, the transmission event may be defined to end later than when the antenna stops transmitting the data or ranging signal.

The scheduled transmission events may correspond to the next data or ranging transmission event. Alternatively or additionally, the scheduled transmission events may refer to different future scheduled transmission events. The scheduled transmission event may be determined by the controller 107 by reference to a look-up table of scheduled transmission events. Alternatively, the scheduled transmission event may be determined by calculating the future transmission event based on a past transmission event and a predetermined wait time between transmission events. In yet another example, the controller 107 may be configured to receive signaling from the data signal controller 103 indicative of one or more future scheduled transmission events (which may include the next event) of the data signal. Similarly, the controller 107 may be configured to receive signaling from the ranging signal controller 104 indicative of one or more future scheduled transmission events of the ranging signal. Any other suitable method may be used to determine each of the scheduled transmission events.

The controller 107 is further configured to determine if the scheduled transmission event of the data signal will occur within a predetermined time window of the scheduled transmission event of the ranging signal. If it is determined that the scheduled transmission event of the data signal will occur within a predetermined time window of the scheduled transmission event ranging event, the controller 107 is configured to determine a priority signal and a secondary signal. The priority signal is one of the data signal and the ranging signal, and the secondary signal is the other of the data signal and ranging signal. The secondary signal will then be prevented from being transmitted such that only the priority signal is transmitted. In this way, data loss may be reduced or avoided entirely and the maximum current usage may also be reduced.

The controller 107 may determine if the scheduled transmission event of the data signal will occur within a predetermined time window of the scheduled transmission event of the ranging signal by comparing the scheduled start and end times of the transmission events of the data and ranging signals. Alternatively, the controller may determine if the scheduled transmission event of the data signal will occur within a predetermined time window of the scheduled transmission event of the ranging signal by comparing a delay until the scheduled start and end times of each of the transmission events of the scheduled data and ranging signals. It will be appreciated that using the delay until the start time of the scheduled transmission events and the duration of the scheduled transmission events would provide for an identical determination. The simultaneous transmission of the data signal and the ranging signal may be referred to as a clash of the data and ranging signals. If the predetermined time window is set to zero seconds, then the controller 107 would be configured to only designate a priority signal and a secondary signal when a direct and simultaneous clash of the data and ranging signals would occur. Preventing such a direct clash of the signals may lead to a reduction in the number of packets lost as a result of interference between the data and ranging signals.

The predetermined time window may represent a buffering period which may be a non-zero buffering period. That is, the predetermined time window may be a period greater than 0 seconds. This non-zero predetermined time window may not only reduce the likelihood of lost data packets due to clashes of the data and ranging signals but it may also limit the high current consumption of the communication and ranging apparatus 100 by reducing the chance of overlapping current consumption. For example, the communication and ranging apparatus 100, and more particularly the ranging signal controller 104, may need to store some current before the transmission of the ranging signal. As such, the predetermined time window may be sufficiently long to allow for the ranging signal controller 104 to store current in preparation for the transmission of the ranging signal, without a data signal being transmitted in such a current-storage period for the ranging signal. In some examples, the predetermined window may extend before and after the transmission event. For example, the controller may define a first time before the start time of the transmission event of the ranging signal and a second time after the end time of the transmission event of the ranging signal where the time interval between the first and second times defines the predetermined time window. In other examples, the predetermined time window may only be a window set before the transmission of the ranging signal such that a clash of signals is only determined if the data signal would be transmitted before the ranging signal within the predetermined time window or simultaneously with the ranging signal. By limiting the peak power consumption of the communication and ranging apparatus 100, the battery life of the apparatus may be extended by 20-80%, depending on the battery. The predetermined time window may particularly be a non-zero predetermined time window in embodiments wherein the transmission event is defined as the period during which the data or ranging antenna is transmitting the corresponding data or ranging signal.

It will be appreciated that, while the above discussion has been provided with reference to the transmission event of the data signal being within a predetermined time window of the ranging signal, this is equivalent to the same situation vice versa. That is to say, that the controller may instead determine whether the transmission event of the ranging signal occurs within a predetermined time window of the data signal.

If it is determined that the scheduled transmission event of the data signal will occur within a predetermined time window of the scheduled transmission event ranging event (i.e., if it is determined that there will be a clash between the data signal transmission and the ranging signal transmission), the controller 107 is configured to determine a priority signal and a secondary signal. The priority signal is one of the data signal and the ranging signal, and the secondary signal is the other of the data signal and ranging signal. There are several ways in which the priority signal and the secondary signal may be set, as outlined in more detail below, such that the scheduled transmission event of the priority signal is transmitted but the scheduled transmission event of the secondary signal is not. It will be appreciated that the following approaches do not represent every possible way to determine which signal should be designated as the priority signal and which should be designated as the secondary signal.

In one or more embodiments, the controller 107 may be configured to calculate a priority score for the data signal and a priority score for the ranging signal based on one or more parameters. The signal having the highest priority score may be designated as the priority signal and the signal having the lowest priority score may be designated as the secondary signal. It will be appreciated that herein, where the highest priority score has been referred to, it would be equivalent for the priority score to be calculated in an alternative manner such that the signal with the lowest priority score to be designated as the priority signal. In essence, it is the signal which is most desirable for transmission that will be prioritised based on one or a combination of parameters which will be designated as the priority signal, and it is purely arbitrary as to whether the scoring system is designed such that the most desirable signal has the highest or the lowest score. The priority score may be calculated by any suitable method such as by adding together various scaling factors based on the importance of parameters. It will be appreciated that several different approaches for determining the priority score might be apparent to the skilled person and that any such approaches would be considered to comprise calculating the priority score. The following discussion will discuss raising the priority score of a signal based on certain conditions and lowering the priority score based on other conditions. It will be appreciated that this phrasing is used with reference to an example where a higher priority score is linked to being designated as the priority signal and a lower priority score is linked to being designated as the secondary signal.

In some examples, the controller 107 may be configured to designate one of the data signal and the ranging signal as the priority signal on the fulfillment of one or more override conditions. This may be the only way in which the priority signal is determined, i.e., priority may only be given when the one or more override conditions are met. In other examples, on the fulfillment of one or more override conditions, any other way of determining the priority signal, such as the priority score, may be overridden such that the designation is based only on the override condition being fulfilled. The override of the priority score may be achieved either by the controller 107 being configured to ignore the priority score if one or more override conditions are met. Alternatively, it could be implemented by causing the priority score of either the data signal or the ranging signal to be weighted so heavily in that signal's favour that no other contributing factors based on other parameters may be able to influence which of the priority scores is highest or lowest.

In one or more embodiments, the controller 107 may be configured to determine the priority signal and the secondary signal based on the distance between the communication and ranging apparatus 100 and the remote device 106. The distance may be known based on previously completed ranging operations as a result of previously transmitted ranging signals. Alternatively, the distance may be known from a previous location-determination and an amount of movement of the communication and ranging apparatus 100 as detected by a movement sensor such as an accelerometer 108. That is, in some examples the controller 107 may be able to: (a) determine a current distance between the communication and ranging apparatus 100 and the remote device 106 based on: (i) a previous distance between the communication and ranging apparatus 100 and the remote device 106; and (ii) movement-data provided by a movement sensor associated with the communication and ranging apparatus 100.

In some examples, it may be that the movement sensor is not able to determine whether or not the communication and ranging apparatus 100 has moved closer to, or further from, the remote device 106, i.e., it may not have directional information available. In such embodiments, the controller 107 may be configured to: (a) determine a distance from a previous location of the communication and ranging apparatus 100 based on: (i) a previous distance between the communication and ranging apparatus 100 and the remote device; and (ii) movement-data provided by a movement sensor associated with the communication and ranging apparatus 100. The controller 107 may be configured to determine the priority signal and the secondary signal based on the distance of the communication and ranging apparatus 100 from the previous location of the communication and ranging apparatus 100. For example, if the distance from the previous location of the communication and ranging apparatus 100 is greater than a movement threshold, the priority value of the ranging signal may be increased. In this way, if the communication and ranging apparatus 100 has moved beyond the movement threshold, a new ranging signal transmission event may assist in reducing the uncertainty in the new position of the communication and ranging apparatus 100. For similar reasons, the controller 107 may be configured to increase the priority value of the ranging signal if the acceleration of the communication and ranging apparatus 100 is above an acceleration threshold.

The controller 107 may be configured to set the priority score of the data signal based on the distance between the communication and ranging apparatus 100 and the remote device 106. That is to say, the static distance between the communication and ranging apparatus 100 and the remote device 106 may be positively correlated to the priority score of the data signal. By giving priority to the data signal based on a large distance between the remote device 106 and the communication and ranging apparatus 100, long latency for the authentication flow or general configuration can be reduced. Further, ranging may be less important at greater distances and preventing the ranging signal transmission (which can be more energy expensive) may help to extend the lifetime of the power supply 105.

Similarly, the controller 107 may be configured to set the priority score of the ranging signal based on the distance between the communication and ranging apparatus 100 and the remove device 106. That is to say that the static distance between the communication and ranging apparatus 100 and the remote device 106 may be negatively or inversely correlated to the priority score of the ranging signal. By prioritising the ranging signal when the communication and ranging apparatus 100 is close to the remote device 106, the risk of increased latency due to disturbances of the ranging signal by air traffic or coupling with any of the printed circuit boards (PCB) of in the communication and ranging apparatus 100 can be reduced. Also, the risk of power-on-rests due to voltage drop when battery power is low can be reduced too.

In some examples, the controller 107 may be configured to set the data signal as the priority signal based on the distance between the communication and ranging apparatus 100 and the remote device 106 being greater than a data override distance (any of the overrides disclosed herein can be implemented as a threshold, for example). In some situations, there may be no need to determine a priority score if the distance between the communication and ranging apparatus 100 and the remote device 106 is greater than the data override distance. This may particularly be the case if the remote device 106 is beyond this range, based on a previous ranging measurement, and the communication and ranging apparatus is not moving, as could be detected by an accelerometer 108. That is, in some examples the controller 107 may be able to: (a) determine a current distance between the communication and ranging apparatus 100 and the remote device 106 based on: (i) a previous distance between the communication and ranging apparatus 100 and the remote device 106; and (ii) movement-data provided by a movement sensor associated with the communication and ranging apparatus 100. In addition, or alternatively, the controller 107 may be configured to set the ranging signal as the priority signal based on the distance between the communication and ranging apparatus 100 and the remove device 106 being less than a ranging override distance.

Similarly, the controller 107 may be configured to: (a) determine a distance from a previous location of the communication and ranging apparatus 100 based on: (i) a previous distance between the communication and ranging apparatus 100 and the remote device; and (ii) movement-data provided by a movement sensor associated with the communication and ranging apparatus 100. The controller 107 may be configured to set the priority signal and the secondary signal based on the distance from the previous location of the communication and ranging apparatus 100. For example, if the communication and ranging apparatus 100 has moved beyond a movement override threshold, the ranging signal may be set as the priority signal. In this way, if the communication and ranging apparatus 100 has moved beyond the movement override threshold, a new ranging signal transmission event may be necessary to assist in reducing the uncertainty in the new position of the communication and ranging apparatus. For similar reasons, the controller 107 may be configured to set the ranging signal as the priority signal if the acceleration of the communication and ranging apparatus 100 is above an acceleration override threshold.

In one or more embodiments, the controller 107 may be configured to determine the priority signal and the secondary signal based on the movement of the communication and ranging apparatus 100. The controller 107 may receive information related to the movement of the communication and ranging apparatus 100 by way of signaling indicative of the movement of the communication and ranging apparatus 100. Movement of the communication and ranging apparatus 100 may be detected by identifying a difference between subsequent ranging operations as a result of subsequent ranging signal transmissions. Alternatively, the communication and ranging apparatus 100 may comprise an accelerometer 108 wherein the accelerometer 108 is configured to provide signaling to the controller 107 indicative of the movement of the communication and ranging apparatus 100. In some examples, the controller 107 may be configured to increase the priority score of the ranging signal based on the detection that the communication and ranging apparatus is moving. A priority score can be increased by adding a predetermined amount to the priority score, or by multiplying the priority score by a predetermined weighting value that is greater than 1, for example. This increase would be on the basis that the movement of the communication and ranging apparatus 100 may necessitate the re-evaluation of the position of the communication and ranging apparatus 100 relative to the remote device 106. In further examples, the controller 107 may be configured to increase the priority score of the ranging signal proportionally to the speed of movement of the communication and ranging apparatus 100 (which may be provided by the accelerometer or may be calculated by determining a rate of change of the location of the communication and ranging apparatus 100). Indeed, the faster the communication and ranging apparatus 100 is moving, the more important it may be to initiate several ranging events by transmitting the ranging signal. In yet further examples, the controller 107 may be configured to designate the ranging signal as the priority signal based on the detection that speed of movement of the communication and ranging apparatus 100 is greater than an override speed.

In one or more embodiments, the controller 107 may be configured to determine the priority signal and the secondary signal based on a signal strength of one or both of the data signal and the ranging signal. For example, the priority score of the data signal may be set based on the data signal strength. That is, the priority score may be positively correlated with the signal strength. Similarly, the priority score of the ranging signal may be reduced as the ranging signal strength becomes weaker. In some cases, the reduction of the priority score may vary monotonically as the signal strength decreases. In other examples, the priority score of the data signal may be decreased if the data signal strength is below a data signal strength threshold and the priority score of the ranging signal may be decreased if the ranging signal strength is below a ranging signal strength threshold. A priority score can be decreased by subtracting a predetermined amount from the priority score, or by multiplying the priority score by a predetermined weighting value that is less than 1, for example. The ranging signal strength may be measured in terms of the received signal strength indicator (RSSI) or in any other suitable way such as by a received channel power indicator (RCPI) of either the data signal or the ranging signal. One or more receivers of the remote device may determine the signal strength of the communication and/or ranging signals and send the signal strength information back to the communication and ranging apparatus 100 through a data signal. In some examples, the controller 107 may be configured to designate the ranging signal as the priority signal if the signal strength of the data signal is below a data signal strength override threshold. Alternatively or additionally, the controller may be configured to designate the data signal as the priority signal if the signal strength of the ranging signal is below a ranging signal strength override threshold. Because the data signal and the ranging signal have different purposes, they may use different frequencies for transmission, such as within the BLE range and the UWB range. As such, these signals may have different skin depths and thereby different levels of attenuation based on the materials between the communication and ranging apparatus 100 and the remote device 106. Because of this, there may be situations where the data signal is stronger than the ranging signal, for example, and sending the ranging signal might result in lost packets because of the low signal strength. In these situations, it may be beneficial to only transmit the stronger of the two signals, or at least to more frequently transmit the stronger of the two signals.

In one or more embodiments, the controller 107 may be configured to determine the priority signal and the secondary signal based on a historical log of transmission events. The historical log of transmission events may be stored by the controller 107, may be stored elsewhere in the communication and ranging apparatus 100, or may be accessible to the communication and ranging apparatus 100 from a remote memory. For example, the log of the data signal transmission events may be maintained by the data signal controller 103 and the log of the ranging signal transmission events may be maintained by the ranging signal controller 104. In some embodiments, the data signal controller 103 and the ranging signal controller 104 may be configured to provide signaling to the controller 107 indicative of the transmission events which have taken place according to the historical log. For example, it may be necessary for a minimum number of data signals to be transmitted in a first predetermined preceding time period in order to maintain a data connection with the remote device 106. If this minimum number of transmission events is not achieved, then the connection between the communication and ranging apparatus 100 and the remote device 106 may be lost, which may be undesirable. Because of this, the controller 107 may be configured to increase the priority score of the data signal if a minimum number of data signal transmission events have not occurred in a first predetermined preceding time period according to the historical log of transmission events. For example, at least one data signal may need to be transmitted every 30 ms, every 70 ms, every 100 ms or longer. In some examples, a standard minimum time delay between data signal transmission events for BLE signals may be 7.5 ms and a maximum allowable time between data signal transmission events may be 4 seconds. Alternatively or additionally, the controller may be configured to increase the priority score of the ranging signal if a minimum number or ranging signal transmission events have not occurred in a second predetermined preceding time period according to the historical log of transmission events. The first predetermined preceding time period for the data signals and the second predetermined preceding time period for the ranging signals may be different because the regularity with which a data signal needs to be transmitted may be different from the regularity with which a ranging signal needs to be transmitted in order to achieve acceptable performance. Alternatively, the predetermined preceding time periods may be the same and the minimum number of data signal transmission events and the minimum number of ranging signal transmission events may be the same. The controller 107 may be configured to designate the data signal as the priority signal if the number of data signal transmission events in the first predetermined preceding time period is below an override number of data signal transmission events according to the historical log of transmission events. Similarly, the controller 107 may be configured to designate the data signal as the priority signal if the number of ranging signal transmission events in the second predetermined time period is below an override number or ranging signal transmission events according to the historical log of transmission events. In still further examples, the controller may be configured to designate the ranging signal as the priority signal if no ranging signals have been transmitted since the communication and ranging apparatus was turned on.

In one or more embodiments, the priority score can be determined at least partially based on a remaining charge level of the power supply 105 that is configured to provide power to the communication and ranging apparatus 100. For example, the controller 107 can be configured to decrease the priority score of the ranging signal in response to receiving signaling indicative that a charge level of the power supply 105 is below a predetermined charge level. Transmission of the ranging signal may drain the power supply 105 more than transmission of the data signal. As such, it may be energy efficient to restrict the transmission of unnecessary ranging signals, particularly when the charge in the power supply 105 is running low. In some embodiments, the controller 107 may be configured to designate the data signal as the priority signal if the remaining charge level of the power supply 105 is below an override charge level.

In one or more embodiments, the priority score can be determined at least partially based on a measurement event. A measurement event may one of a plurality of different occurrences which increase the need of, of necessitate, either a data signal transmission or a ranging signal transmission. A measurement event may be a user-initiated measurement event such as, where the communication and ranging apparatus 100 is a key fob for a car, a request by a user of the key fob to unlock the car. An unlock request may first necessitate a ranging signal transmission in order to determine whether the car (the remote device 106) is close enough to the key fob for an unlock instruction to be acceptable. As such, the priority score of the ranging signal might be increased in response to a user-initiated unlock request. Other examples of user-initiated measurement events may include car start-up, (in the case of IoT devices) periodic pandemic tracker (for social distancing), or handshake events. In some cases, the measurement event may take precedence over any other factors and so the controller 107 may be configured to designate the priority signal to be the measurement signal in override of the priority score based on a measurement event. The controller 107 may receive an indicator of the measurement event or user-initiated measurement event request by way of signaling received by the controller 107 indicative that a measurement event is required or desired.

It will be appreciated that the above list of parameters on which the determination of the priority signal is based is non-exhaustive, and that different applications might have different requirements which require different parameters to be taken into account for determination of the priority signal. Further, only one or only a subset of these (or other) parameters may be used to determine which signal should be designated as the priority signal and which should be designated as the secondary signal. Alternatively, all of the parameters might be used in calculating the priority score. Further, the parameters might be given the same weighting in calculating the priority score or may be given different weightings, depending on the relative importance of those parameters. In embodiments comprising one or more override conditions, the controller may be considered to apply the override conditions hierarchically such that a first override condition may take precedence over a second override condition. In this way, even if more than one override condition is met, the controller is still able to determine which signal to assign as the priority signal and which to assign as the secondary signal. This may be implemented, for example, by assigning a predetermined priority score to each override condition such that the predetermined priority scores define the hierarchy.

As indicated above, after one of the data signal and the ranging signal has been designated as the priority signal and the other of the data signal and the ranging signal has been designated as the secondary signal, the controller 107 can prevent the scheduled transmission event of the secondary signal from being transmitted such that only the scheduled transmission event of the priority signal is transmitted. The signaling provided by the controller 107 may be provided to any suitable part of the communication and ranging apparatus 100 so that the secondary signal is inhibited and thereby prevented from transmitting. In one example, the signaling provided by the controller 107 may be configured to prevent a signal generator of the secondary signal from generating the secondary signal. In another example, the impedance between the signal generator and the antenna 101, 102 may be increased in order to prevent the secondary signal from reaching the antenna 101, 102 for transmission. The impedance may be increased in any suitable way such as by opening a switch in the signal path associated with the data signal controller 103 or the ranging signal controller 104, or by changing the impedance of a variable impedance component (like a variable resistor, variable inductor or variable capacitor). It will be appreciated that other ways of preventing the transmission of the secondary signal can be used.

The controller 107 may or may not take an active step to record in memory which signal is the priority signal and which is the secondary signal. If it does not then, upon determining which signal has the highest priority score (or which signal should be the priority signal based on an override condition), the controller 107 may provide signaling to inhibit the secondary signal without taking further action. Taking this action in relation to the secondary signal in order to allow the priority signal to be transmitted without interference may be considered to be all that is required for the priority signal the secondary signal to have been determined.

The priority signal and the secondary signal may be determined for each instance where it is found that the data signal would be transmitted within a predetermined time window of the transmission event of the ranging signal.

FIG. 2 shows an example method 200 of controlling a communication and ranging apparatus wherein the communication and ranging apparatus is configured to transmit both a data signal from a first antenna and a ranging signal from a second antenna. The method comprises the steps of determining 201 a scheduled transmission event of the data signal and determining 202 a scheduled transmission event of the ranging signal. The method then comprises determining 203 if the scheduled transmission event of the data signal will occur within a predetermined time window of the scheduled transmission event of the ranging signal (or vice versa; that is, determining if the scheduled transmission event of the ranging signal will occur within a predetermined time window of the scheduled transmission event of the data signal). If it is determined that the scheduled transmission event of the data signal will occur within a predetermined time window of the scheduled transmission event of the ranging signal, or vice versa, then the method further comprises determining 204 a priority signal and a secondary signal. As set out above, the priority signal is one of the data signal and the ranging signal and the secondary signal is the other of the data signal and the secondary signal. Finally, the method comprises providing 205 signaling configured to prevent the scheduled transmission event of the secondary signal from being transmitted such that only the scheduled transmission event of the priority signal is transmitted.

Figure 3:
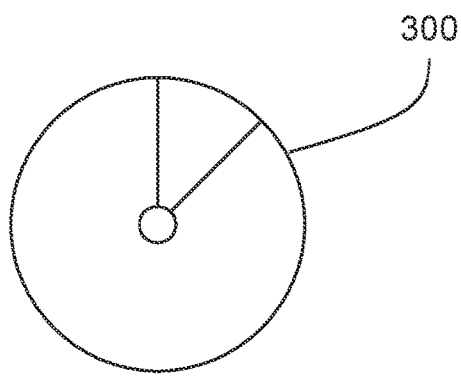
FIG. 3 shows a computer readable medium comprising instructions to cause a processor to carry out the method of controlling a communication and ranging apparatus.

FIG. 3 shows a computer readable medium 300 comprising instructions to cause a processor to carry out the method outlined with reference to FIG. 2.

The instructions and/or flowchart steps in the above figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

It will be appreciated that any components said to be coupled may be coupled or connected either directly or indirectly. In the case of indirect coupling, additional components may be located between the two components that are said to be coupled.

In this specification, example embodiments have been presented in terms of a selected set of details. However, a person of ordinary skill in the art would understand that many other example embodiments may be practiced which include a different selected set of these details. It is intended that the following claims cover all possible example embodiments.

The invention claimed is:

1. A controller for a communication and ranging apparatus wherein the communication and ranging apparatus is configured to transmit both a data signal from a first antenna and a ranging signal from a second antenna, wherein the controller is configured to:
   determine a scheduled transmission event of the data signal;
   determine a scheduled transmission event of the ranging signal;
   determine if the scheduled transmission event of the data signal will occur within a predetermined time window of the scheduled transmission event of the ranging signal, or vice versa;
   if it is determined that the scheduled transmission event of the data signal will occur within a predetermined time window of the scheduled transmission event of the ranging signal, or vice versa, then determine a priority signal and a secondary signal, wherein: the priority signal is one of the data signal and the ranging signal; and the secondary signal is the other of the data signal and the ranging signal; and
   provide signalling configured to prevent the scheduled transmission event of the secondary signal from being transmitted such that only the scheduled transmission event of the priority signal is transmitted.

2. The controller of claim 1 wherein the controller is configured to determine the priority signal and the secondary signal based on one or more of:
   a distance between the communication and ranging apparatus and the remote device;
   movement of the communication and ranging apparatus;
   a signal strength of one or both of the data signal and the ranging signal;
   a remaining charge level of a power supply that is configured to provide power to the communication and ranging apparatus;
   a historical log of transmission events; and
   a user-initiated measurement event.

3. The controller of claim 1 wherein the controller is configured to:
   calculate a priority score for each of the data signal and the ranging signal; and designate the signal with the highest priority score as the priority signal.

4. The controller of claim 3 wherein the controller is configured to set the priority score of the data signal based the distance between the communication and ranging apparatus and the remote device.

5. The controller of claim 3 wherein the controller is configured to set the priority score for the ranging signal based on a detection that the communication and ranging apparatus.

6. The controller of claim 1, wherein the controller is configured to:
   receive signalling from an accelerometer forming part of the communication and ranging apparatus, wherein the signalling is indicative of movement of the communication and ranging apparatus; and
   determine the priority signal and the secondary signal based on the signalling from an accelerometer.

7. The controller of claim 3 wherein the controller is configured to one or both of:
   decrease the priority score of the data signal if a data signal strength of the data signal is below a data signal strength threshold; and
   decrease the priority score of the ranging signal if a ranging signal strength of the ranging signal is below a ranging signal strength threshold.

8. The controller of claim 3 wherein the controller is configured to increase the priority score of the ranging signal in response to receiving signalling indicative of a measurement event.

9. The controller of claim 8 wherein the controller is configured to decrease the priority score of the ranging signal in response to receiving signalling indicative that a charge level the power supply is below a predetermined charge level.

10. The controller of claim 3 wherein the controller is configured to one or both of:
    increase the priority score of the data signal if a minimum number of data signal transmission events have not occurred in a first predetermined preceding time period according to a historical log of transmission events; and
    increase the priority score of the ranging signal if a minimum number of ranging signal transmission events have not occurred in a second predetermined preceding time period according to the historical log of transmission events.

11. The controller of claim 3 wherein the controller is configured to designate one of the data signal and the ranging signal as the priority signal based on one or more of:
    the distance between the communication and ranging apparatus and the remote device being greater than a data override distance;

the distance between the communication and ranging apparatus and the remote device being less than a ranging override distance;

a speed of movement of the communication and ranging apparatus being greater than an override speed;

the signal strength of the data signal being below a data signal strength override threshold or the signal strength of the ranging strength being below a ranging signal strength override threshold;

the number of data signal transmission events in the first predetermined preceding time period is below an override number of data signal transmission events or the number of ranging signal transmission events in the second predetermined time period is below an override number of ranging signal transmission events according to the historical log of transmission events;

a measurement event.

12. The controller of claim 1 wherein the data signal is a Bluetooth low energy, BLE, signal and the ranging signal is an ultrawideband, UWB, signal.

13. A communication and ranging apparatus comprising:
a first antenna configured to transmit a data signal;
a second antenna configured to transmit a ranging signal; and
the controller of claim 1.

14. A method of controlling a communication and ranging apparatus wherein the communication and ranging apparatus is configured to transmit both a data signal from a first antenna and a ranging signal from a second antenna, the method comprising:
determining a scheduled transmission event of the data signal;
determining a scheduled transmission event of the ranging signal;
determining if the scheduled transmission event of the data signal will occur within a predetermined time window of the scheduled transmission event of the ranging signal;
if it is determined that the scheduled transmission event of the data signal will occur within a predetermined time window of the scheduled transmission event of the ranging signal, the method further comprises determining a priority signal and a secondary signal, wherein the priority signal is one of the data signal and the ranging signal and the secondary signal is the other of the data signal and the ranging signal; and
providing signalling configured to prevent the scheduled transmission event of the secondary signal from being transmitted such that only the scheduled transmission event of the priority signal is transmitted.

15. The method of claim 14 wherein the method further comprises determining the priority signal and the secondary signal based on one or more of:
a distance between the communication and ranging apparatus and the remote device;
movement of the communication and ranging apparatus;
a signal strength of one or both of the data signal and the ranging signal;
a remaining charge level of a power supply that is configured to provide power to the communication and ranging apparatus;
a historical log of transmission events; and
a user-initiated measurement event.

16. The method of claim 14 wherein the method further comprises calculating a priority score for each of the data signal and the ranging signal; and designating the signal with the highest priority score as the priority signal.

17. The method of claim 16 further comprising setting the priority score of the data signal based the distance between the communication and ranging apparatus and the remote device.

18. The method of claim 17 further comprising:
decreasing the priority score of the data signal if a data signal strength of the data signal is below a data signal strength threshold; and
decreasing the priority score of the ranging signal if a ranging signal strength of the ranging signal is below a ranging signal strength threshold.

19. The method of claim 14 further comprising designating one of the data signal and the ranging signal as the priority signal based on one or more of:
the distance between the communication and ranging apparatus and the remote device being greater than a data override distance;
the distance between the communication and ranging apparatus and the remote device being less than a ranging override distance;
a speed of movement of the communication and ranging apparatus being greater than an override speed;
the signal strength of the data signal being below a data signal strength override threshold or the signal strength of the ranging strength being below a ranging signal strength override threshold;
the number of data signal transmission events in the first predetermined preceding time period is below an override number of data signal transmission events or the number of ranging signal transmission events in the second predetermined time period is below an override number of ranging signal transmission events according to the historical log of transmission events;
a measurement event.

20. A computer readable medium comprising instructions to cause a processor to carry out the method of claim 14.

21. The controller of claim 1, wherein the signaling increases an impedance in the communication and ranging apparatus to cause the secondary signal to not reach an antenna.

22. The method of claim 14, wherein the signaling increases an impedance in the communication and ranging apparatus to cause the secondary signal to not reach an antenna.

* * * * *